US007428220B1

(12) United States Patent
Caronni et al.

(10) Patent No.: US 7,428,220 B1
(45) Date of Patent: Sep. 23, 2008

(54) METHOD AND APPARATUS FOR DATA AGGREGATION IN A DISTRIBUTED SYSTEM

(75) Inventors: Germano Caronni, Menlo Park, CA (US); Raphael J. Rom, Palo Alto, CA (US); Glenn Carter Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 555 days.

(21) Appl. No.: 11/055,263

(22) Filed: Feb. 10, 2005

(51) Int. Cl.
 *H04L 12/28* (2006.01)
(52) U.S. Cl. ...................... 370/254; 370/400
(58) Field of Classification Search ................. 370/256, 370/408
 See application file for complete search history.

(56) References Cited

U.S. PATENT DOCUMENTS

2005/0086469 A1* 4/2005 Dunagan et al. ............ 713/163
2005/0187946 A1* 8/2005 Zhang et al. ................ 707/100
2005/0243740 A1* 11/2005 Chen et al. .................. 370/256

OTHER PUBLICATIONS

A. Adya, et al.; "Farsite: Federated, Available, and Reliable Storage for an Incompletely Trusted Environment"; Proceedings of the 5th Symposium on Operating Systems and Design Implementation OSDI; Dec. 2002 (14 pages).
I. Clarke, et al.; "Freenet: A Distributed Anonymous Information Storage and Retrieval System"; Lecture Notes in Computer Science; 2000 (21 pages).
J. Kubiatowicz, et al.; "OceanStore: An Architecture for Global-Scale Persistent Storage"; Proceedings of ACM ASPLOS; Nov. 2000 (12 pages).
A. Rowstron, et al.; "Storage Management and Caching in PAST, a Large-Scale, Peristent Peer-to-Peer Storage Utility"; Symposium on Operating Systems Principles; Oct. 2001 (13 pages).
S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).
A. Muthitacharoen, et al.; "Ivy: A Read/Write Peer-to-Peer File System"; Proceedings of the 5th USENIX Symposium on Operating Systems Design and Implementation (OSDI '02); Dec. 2002 (23 pages).
F. Dabek, et al.; "Towards a Common API for Structured Peer-to-Peer Overlays"; Proceedings of 2nd International Workshop on Peer-to-Peer Systems (IPTPS '03), Feb. 2003 (11 pages).

(Continued)

*Primary Examiner*—Chau T. Nguyen
*Assistant Examiner*—Hicham B Foud
(74) *Attorney, Agent, or Firm*—Osha•Liang LLP (57) ABSTRACT

The invention involves a method for aggregating data in a distributed system. The method includes specifying an aggregation scope including a plurality of nodes, where the plurality of nodes includes a destination node and a plurality of non-destination nodes. The method also includes defining an aggregation tree for the plurality of nodes using at least one Distributed Hash Table, where the destination node is the root of the aggregation tree and where each of the plurality of non-destination nodes is one selected from a group of an interior node and a leaf node in the aggregation tree. The method also includes determining a final aggregation result for the aggregation tree using an aggregation function and aggregation data stored on the destination node and the plurality of non-destination nodes.

13 Claims, 5 Drawing Sheets

OTHER PUBLICATIONS

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures; Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. 30$^{th}$ Annual ACM Symposium on Theory of Computing (STOC): May 1998 (10 pages).

\* cited by examiner

METHOD AND APPARATUS FOR DATA AGGREGATION IN A DISTRIBUTED SYSTEM

BACKGROUND

A distributed system typically includes a number of interconnected nodes. The nodes often include a processor and memory (e.g., Random Access Memory (RAM)). In addition, the nodes also include the necessary hardware and software to communicate with other nodes in the distributed system. The interconnected nodes may also communicate with each other using an overlay network.

Nodes belonging to the overlay network route messages between each other using the underlying networking infrastructure (e.g., Internet Protocol (IP) and Transmission Control Protocol (TCP), etc.). While the underlying network infrastructure has the information and capability to directly route messages between specific computers, overlay networks typically maintain only partial routing information and rely on successive forwarding through intermediate nodes in order to deliver a message to its final intended destination. One common use for overlay networks is to build distributed hash tables (DHT). In one implementation, each node in the overlay network is associated with a Globally Unique Identifier (GUID) and stores a part of the DHT.

When a node (i.e., the requesting node) requires a piece of data stored on a node (i.e., a target node) in the overlay network, the requesting node determines the GUID associated with target node, which contains the requested data. The requesting node then queries its routing table entries (i.e., the DHT entries) to find the node (i.e., an intermediate node) with the GUID closest to the target node's GUID. The request is then forwarded to the intermediate node. The intermediate node follows the same process, comparing the target node's GUID with the intermediate node's routing table entries. The aforementioned process is repeated until the target node is reached. Typically, the overlay network maintains enough information in the DHT to determine the appropriate intermediate node.

To store data in the aforementioned overlay network, the data is loaded onto a particular node (i.e., a target node) in the overlay network and is associated with a GUID. The node that stores the data subsequently publishes the presence of the GUID on the node. Another node (i.e., the root node) in the network stores the necessary information in its DHT to indicate that the data associated with the GUID is stored in the target node. It is important to note that any given node in the overlay network may operate as both a target node (i.e., stores data) and as a root node (i.e., maintains a DHT). Typically, a given root node is only responsible for a certain range of GUIDs.

SUMMARY

In general, in one aspect, the invention relates to a method for aggregating data in a distributed system, comprising specifying an aggregation scope comprising a plurality of nodes, wherein the plurality of nodes comprise a first destination node and a first plurality of non-destination nodes, defining a first aggregation tree for the plurality of nodes using at least one Distributed Hash Table, wherein the first destination node is the root of the first aggregation tree and wherein each of the first plurality of non-destination nodes is one selected from the group consisting of an interior node and a leaf node in the first aggregation tree, and determining a first final aggregation result for the first aggregation tree using an aggregation function and aggregation data stored on the first destination node and the first plurality of non-destination nodes.

In general, in one aspect, the invention relates to a method for aggregating data in a distributed system, comprising specifying an aggregation scope comprising a plurality of nodes, wherein the plurality of nodes comprise a first destination node and a first plurality of non-destination nodes, initiating data aggregation using an initiation method, wherein the initiation method initiates data aggregation in the plurality of nodes, receiving a first intermediate aggregation result by at least one of the first plurality of non-destination nodes, applying an aggregation function to the first intermediate aggregation result and a first local aggregation data by the at least one of the first plurality of non-destination nodes to obtain a first updated intermediate aggregation result, wherein the first local aggregation data is obtained from the at least one of the first plurality of non-destination nodes, forwarding the first updated intermediate aggregation result to the first destination node, wherein the forwarding the first updated aggregation result comprises using a first Distributed Hash Table (DHT), and applying the aggregation function to the first updated intermediate aggregation result and a second local aggregation data by the first destination node to obtain a first final aggregation result, wherein the second local aggregation data is obtained from the first destination node.

In general, in one aspect, the invention relates to a distributed system, comprising a first aggregation tree comprising a first destination node and a first plurality of non-destination nodes, wherein the first destination node and the first plurality of non-destination nodes are within an aggregation scope, wherein the first destination node and the first plurality of nodes communicate using at least one distributed hash table, wherein each of the non-destination nodes communicate with each other using at least one distributed hash table, and wherein the first destination node and the first plurality of non-destination nodes are configured to determine a first final aggregation result for the first aggregation tree using an aggregation function and aggregation data stored on the first destination node and the first plurality of non-destination nodes.

In general, in one aspect, the invention relates to a computer readable medium comprising software instructions for aggregating data in a distributed system, the software instructions comprising functionality to specify an aggregation scope comprising a plurality of nodes, wherein the plurality of nodes comprise a first destination node and a first plurality of non-destination nodes, define a first aggregation tree for the plurality of nodes using at least one Distributed Hash Table, wherein the first destination node is the root of the first aggregation tree and wherein each of the first plurality of non-destination nodes is one selected from the group consisting of an interior node and a leaf node in the first aggregation tree, and determine a first final aggregation result for the first aggregation tree using an aggregation function and aggregation data stored on the first destination node and the first plurality of non-destination nodes.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for aggregating data in a distributed system. More specifically, embodiments of the invention provide a method for aggregating data in a distributed system using the existing distributed hash tables (DHT) to create an aggregation tree structure to be used to aggregate the data. Further, embodiments of the invention provide a method and apparatus for verifying a final aggregation result (i.e., the result of aggregating data) by including functionality to readily change the aggregation tree structure.

Figure 1:
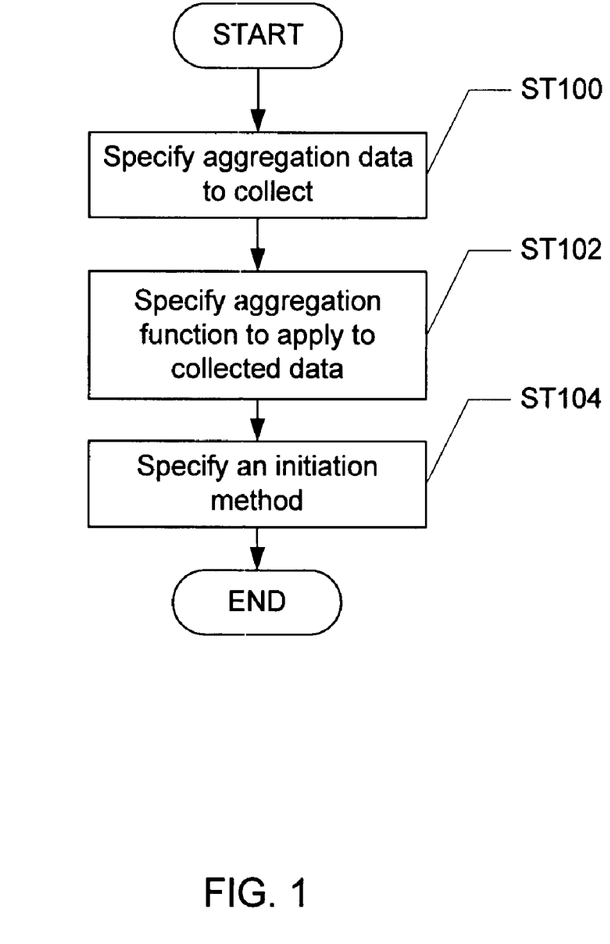
FIGS. 1 and 2 show flowcharts in accordance with one embodiment of the invention.

FIG. 1 shows a flowchart in accordance with one embodiment of the invention. In one embodiment of the invention, the flowchart shown in FIG. 1 describes the various configuration parameters that may be set prior to initiation of aggregation in the distributed system. Those skilled in the art will appreciate that the follow configuration parameters may be set immediately prior to the aggregation or set sometime in advance of the aggregation. Initially, the data to be collected (hereafter "aggregation data") is specified (ST100). The aggregation data may include any data that may be aggregated. For example, the aggregation data may include, but is not limited to, available storage space, number requests serviced, etc. In some cases, the type of aggregation data may be limited by an be limited by an aggregation function (described below).

Once the aggregation data has been specified, an aggregation function may be specified (ST102). The aggregation function corresponds to the function applied to the aggregation data to generate an aggregation result. In one embodiment of the invention, the aggregation function may be any function. In one embodiment of the invention, the aggregation function may correspond to a function that has both commutative and associative properties. For example, the aggregation function may be, but is not limited to, one of the following functions: mean (average), median, mode, sum, product, maximum, standard deviation, and minimum.

In one embodiment of the invention, a number of aggregation data-aggregation function pairs may be specified. In such an implementation, the specific aggregation data-aggregation function pair may be selected for a particular aggregation. The information necessary to perform the specified aggregation (i.e., using the specific aggregation data-aggregation function pair) may be communicated to the nodes within the aggregation scope during initiation of the aggregation (discussed below).

Continuing with FIG. 1, once the aggregation data and the aggregation function are selected, then an initiation method may be specified (ST104). In one embodiment of the invention, the initiation method corresponds to the method used to initiate the aggregation. In one embodiment of the invention, the initiation method is a scheduled initiation. In one embodiment of the invention, the scheduled initiation corresponds to initiating aggregation based on a schedule. The schedule may specify that the aggregation is to take place every hour, day, etc. Alternatively, the schedule may just include various scheduled times to initiate aggregation. As an alternative, the schedule may indicate events, as opposed to times, when aggregation should be initiated. Any event may be used to initiate aggregation.

Alternatively, in one embodiment of the invention, aggregation is initiated using a broadcast method. In one embodiment of the invention, the broadcast method includes sending messages to the nodes involved in the aggregation (i.e., the nodes within an aggregation scope). Depending on the information present in the nodes, the messages may merely indicate that aggregation is to be initiated. Alternatively, the message may be used to communicate one or more of the aforementioned configuration parameters.

In one embodiment of the invention, the aforementioned messages may be communicated directly to all the nodes in the aggregation scope. Alternatively, the messages may be communicated to all the nodes in the aggregation scope by propagating the message from, for example, the root to the neighbors of the root. The neighbors of the root subsequently forward the message to their neighbors. The aforementioned process is repeated until all the nodes in the aggregation scope receive the message. The aforementioned method may be referred to as the "ripple" or "flooding" method.

In another embodiment of the invention, a number of initiation methods may be specified (i.e., the nodes include functionality to initiate aggregation using either scheduled initiation or the broadcast method) and the particular initiation method to be used for a particular aggregation is selected prior to initiating the aggregation.

Figure 2:
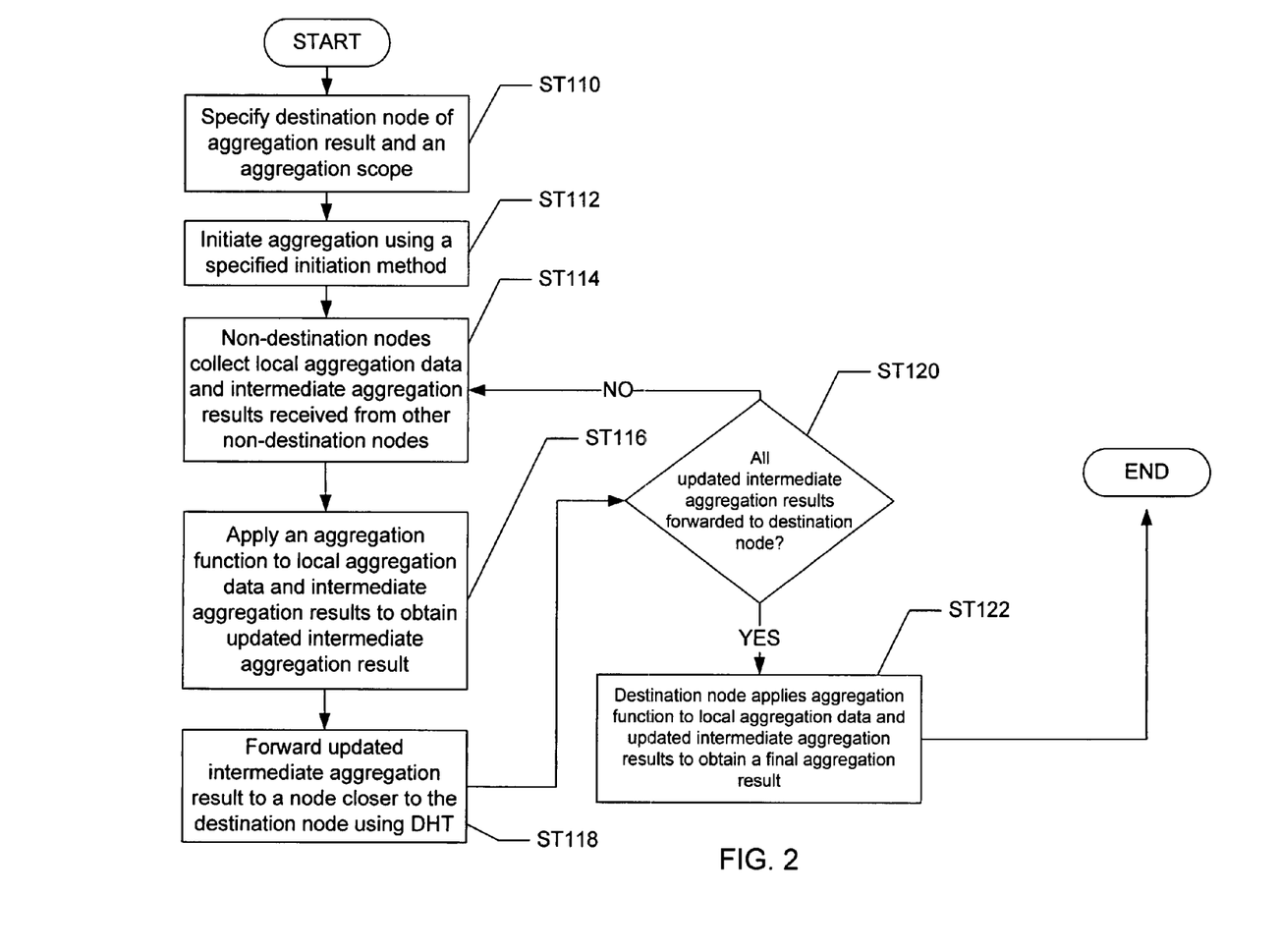

At this stage, the configuration parameters have been set and the distributed system may now aggregate data in one or more embodiments of the invention. FIG. 2 shows a flowchart in accordance with one embodiment of the invention. Prior to initiating the aggregation, a destination node and an aggregation scope are specified (ST110). In one embodiment of the invention, the destination node is the node in the distributed system that calculates the final aggregation result. Thus, all intermediate aggregation data (i.e., data which is used to determine the final aggregation result) is forwarded (directly or indirectly) to the destination node. Said another way, the destination node is the root of the aggregation tree.

In one embodiment of the invention, the aggregation scope specifies the nodes which are involved in the aggregation. More specifically, each node in the aggregation scope provides aggregation data used to calculate an intermediate aggregation result and/or a final aggregation result. In one embodiment of the invention, the aggregation scope is statically specified using a list that includes the GUIDs (or another identifier) of each of the nodes within the aggregation scope. Alternatively, the aggregation scope may be specified using a policy that states criteria used to determine whether a given node in the distributed system is within the aggregation scope. For example, the policy may specify that each node that has a GUID within a certain range is within the aggregation scope. Alternatively, the policy may specify that nodes with certain software components and/or hardware components are within the aggregation scope. The specification of the aggregation scope allows a specific subset of all the nodes in a distributed system to be included in the aggregation.

Those skilled in the art will appreciate that once the aggregation scope and destination node have been specified, that the corresponding aggregation tree (i.e., the aggregation tree with the destination node as the root) will be implicitly self organizing based on the DHTs associated with each of the nodes within the aggregation scope. More specifically, each of the non-destination nodes uses their DHT to determine a neighboring node which is closer (though not necessarily the neighboring node in the DHT which is the closest to the destination node) to the destination node (and in some cases is the destination node). When the non-destination node receives aggregation data (and other data involved in the aggregation) which is involved in the aggregation, the non-destination node forwards this information to the aforementioned neighboring node. In this manner, the aggregation data (and other data involved in the aggregation) is eventually forwarded to the destination node. The aforementioned connections between the non-destination nodes and their neighboring nodes (which are non-destination nodes or the destination node) together make up the aggregation tree. Those skilled in the art will appreciate that the tree structure of a given set of nodes in an aggregation tree may change if the destination node changes.

Continuing with the discussion of FIG. 2, once the aggregation scope and the destination node have been specified, the aggregation is initiated using a specified initiation method (ST112). In one embodiment, aggregation is initiated using the initiation method specified in ST104. Alternatively, a particular initiation method may be selected from a number of initiation methods specified in ST104. At this stage, the aggregation of aggregation data has been initiated. The initiation of aggregation includes informing all nodes within the aggregation scope that aggregation has been initiated.

Once the aggregation has been initiated, the non-destination nodes begin collecting local aggregation data and/or receiving intermediate aggregation result(s) from other non-destination nodes (ST116). In one embodiment of the invention, the local aggregation data corresponds to aggregation data associated with the particular non-destination node. Further, the intermediate aggregation results correspond to results generated by applying the aggregation function to one or more pieces of local aggregation data and intermediate aggregation result. Those skilled in the art will appreciate that a given non-destination node may receive intermediate aggregation data from one or more non-destination nodes depending on the location of the non-destination node in the aggregation tree. Further, those skilled in the art will appreciate that a given non-destination node may also receive local aggregation data for other non-destination nodes.

Once the local aggregation data and the intermediate aggregation result(s) have been received by a given non-destination node, the non-destination node applies the aggregation function to the local aggregation data and the intermediate aggregation result to obtain an updated intermediate aggregation result (ST116). The updated aggregation result is subsequently forwarded to another node (i.e., a non-destination node or the destination node) which is closer to the destination node (or in some cases is the destination node) using a DHT (ST118).

A determination is subsequently made as to whether all updated intermediate aggregation results have been forwarded to the destination node (ST120). If all updated intermediate aggregation results have been forwarded to the destination node, then ST114-ST118 are repeated at each of the non-destination nodes which has not forwarded updated intermediate aggregation results to the destination node. Those skilled in the art will appreciate that the time required to propagate updated intermediate aggregation results from a particular non-destination node to the destination node may vary depending on the structure of the aggregation tree.

Once the destination node receives all the updated intermediate aggregation results from the non-destination nodes that it is directly connected to (via DHT), the destination node applies the aggregation function to the local aggregation data (i.e., the aggregation data on the destination node) and the updated intermediate aggregation results to obtain a final aggregation result (ST122).

Figure 3:
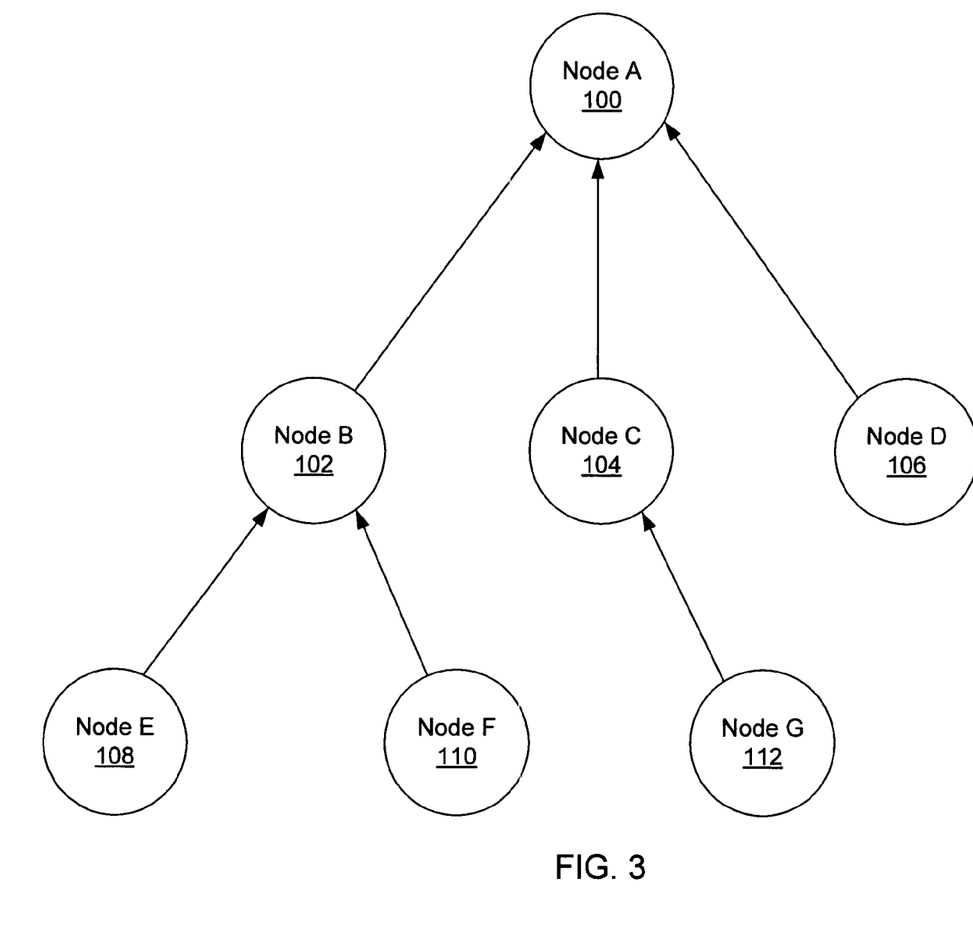
FIGS. 3 and 4 show examples of a distributed system implementing one or more embodiments of the invention.

FIG. 3 shows an example of a distributed system implementing one or more embodiments of the invention. The distributed system shown in FIG. 3 includes seven nodes, namely, Node A (100), Node B (102), Node C (104), Node D (106), Node E (108), Node F (110), and Node G (112). Each of the nodes shown in FIG. 3 includes a DHT (not shown). In the specific example, shown in FIG. 3, the Node A (100) is the destination node. Based on the DHTs in each of the other nodes, the aggregation tree structure shown in FIG. 3 is created. As discussed above, there is no explicit creation of the aggregation tree structure. Rather, the aggregation tree structure is implicitly created by specifying the destination node. Thus, once the destination node is specified, each of the non-destination nodes in the aggregation scope determines (using a DHT) a neighboring node which is closest to the destination node (or in some cases is the destination node).

In the example shown in FIG. 3, the closest neighboring node to the destination node for Node E (108) and Node F (110) is Node B (102). Similarly, the closest neighboring node to the destination node for Node G (112) is Node C (102). Further, the closest neighboring node to the destination node for Node B (102), Node C (104), and Node D (106) is the destination node (i.e., Node A). The information corresponding to the closest neighboring node to the destination node is used to determine where to forward the intermediation aggregation results (including updated aggregation results). Those skilled in the art will appreciate that Node D (106), Node E (108), Node F (110), and Node G (112) are leaf nodes. Further, those skilled in the art will appreciate that Node B (102) and Node C (104) are interior nodes.

Specifically, in the example shown in FIG. 3, Node E (108) and Node F (110) forward local aggregation data to Node B (102). Node B (102) upon receiving the local aggregation data, obtains its own local aggregation data, and then applies the aggregation function to all the aforementioned data to obtain an intermediate aggregation result. Node B (102) then forwards the intermediate aggregation result to the neighboring node closest to the destination node, which in this case is the destination node (i.e., Node A (100)). During the same time frame that operations are being performed on the aforementioned nodes, Node G (112) forwards local aggregation data to Node C (104). Node C (104) upon receiving the local aggregation data, obtains its own local aggregation data, and then applies the aggregation function to all the aforementioned data to obtain an intermediate aggregation result. Node C (104) then forwards the intermediate aggregation result to the neighboring node closest to the destination node, which in this case is the destination node (i.e., Node A (100)). Similarly, Node D (106) forwards local aggregation data to Node A (100).

Once Node A (100) has received the intermediate aggregation results (and, in this example, the local aggregation data from Node D (106)), Node A (100) obtains its own local aggregation data, and then applies the aggregation function to all the aforementioned data to obtain a final aggregation result. In one embodiment of the invention, each node in the distributed system waits for a pre-determined period of time to receive information from nodes, which are to forward local aggregation information and/or intermediate aggregation results. For example, Node B (102) would wait for a pre-determined time to receive data from Node E (108) and Node F (110). If data is not received within that period of time, then the non-responding node may be removed from the aggregation scope. The pre-determined time period may be used for performance reasons or, alternatively, to remove inoperative and/or improperly acting nodes from the aggregation scope.

In one embodiment of the invention, the final aggregation result may be verified. More specifically, in one embodiment the final aggregation result may be verified by using the same aggregation data, the same aggregation function, the same type of aggregation scope, and a different destination node. Because the aggregation tree structure is determined based on the destination node, changing the destination node, necessarily changes the aggregation tree structure (i.e., changes how the aggregation data and intermediate results are calculated and forwarded to the destination node). Thus, if an improperly acting node exists (i.e., a node that produces inconsistent aggregation data), then changing the location of the node in the aggregation tree impacts the final aggregation result.

Accordingly, by comparing the final aggregation result calculated using the same aggregation scope, same aggregation function, the same type of aggregation data, and different destination nodes, the final aggregation result may be verified. If the aforementioned final aggregation results are not the same (or within acceptable threshold), then final aggregation is incorrect (or potentially incorrect). Those skilled in the art will appreciate that by changing the aggregation tree structure, improperly acting nodes may be identified.

Figure 4:
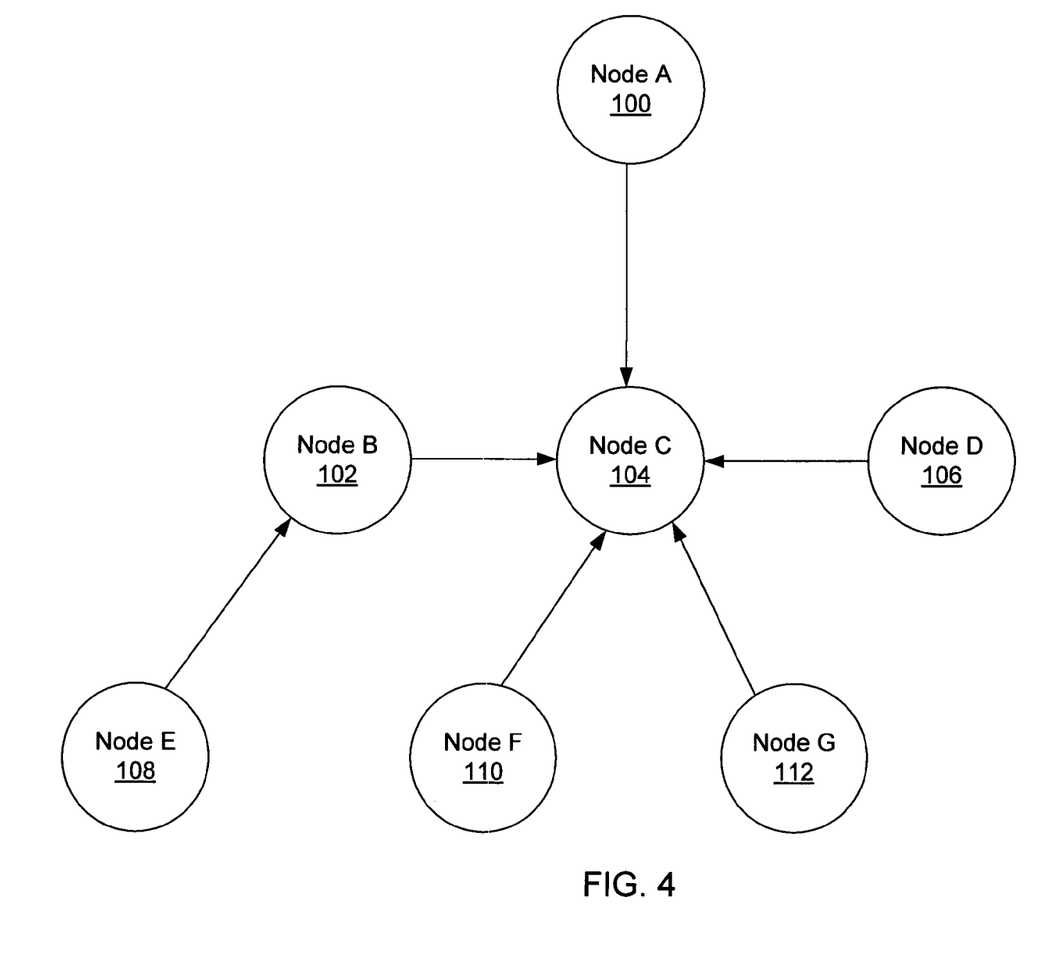

FIG. 4 shows the distributed system of FIG. 3 with a different aggregation tree structure in accordance with one embodiment of the invention. More specifically, FIG. 4 shows a different aggregation tree which may be used to verify the final aggregation result obtained by Node A (100) in FIG. 3. In the aggregation tree shown in FIG. 4, Node C (104) is the destination node. When aggregation is initiated in the distributed system shown in FIG. 4, Node E (108) forwards local aggregation data to Node B (102). Node B (102) upon receiving the local aggregation data, obtains its own local aggregation data, and then applies the aggregation function to all the aforementioned data to obtain an intermediate aggregation result. Node B (102) then forwards the intermediate aggregation result to the neighboring node closest to the destination node, which in this case is the destination node (i.e., Node C (104)).

Based on the aggregation tree structure shown in FIG. 4, the remaining nodes (i.e., Node A (100), Node D (106), Node E (110), and Node F (112)) forward their local aggregation data directly to the destination node (i.e., Node C (104)). Once Node C (104) has received the intermediate aggregation results (and, in this example, the local aggregation data from Node A (100), Node D (106), Node E (110), and Node F (112)), Node C (104) obtains its own local aggregation data, and then applies the aggregation function to all the aforementioned data to obtain a final aggregation result. The final aggregation result obtained by Node C (104) may then be compared with the final aggregation result obtained by Node A (100) in FIG. 3 to verify the final aggregation result obtained by Node A (100).

In one embodiment of the invention, certain non-destination nodes (hereafter "verification nodes") may be used to verifying intermediate aggregation results. In one embodiment, the verification nodes request each of the non-destination nodes directly connected to it in aggregation tree structure to forward both the intermediate aggregation results they calculated as well as the raw data (i.e., the intermediate aggregation results received by the non-destination nodes as well as the local aggregation data associated with the non-destination nodes) used to calculate the intermediate aggregation results. The verification nodes may then independently calculate the intermediate aggregation result using the raw data and compare that to the intermediate aggregation results received from the non-destination nodes.

Alternatively, each non-destination node may send the intermediate result to a non-destination node (or, in some cases, the destination node) and to a number of other non-destination nodes (hereafter "agreement nodes"). The aforementioned agreement nodes along with the non-destination node then reach an agreement, for example based on a majority of votes, about what is the correct value for the intermediate result. Once the agreement is reached, the correct value of the intermediate result (if it has not already been forwarded to the non-destination node) is forwarded to the non-destination node. The aggregation then proceeds as described above in FIG. 2.

In one implementation of embodiments of the invention, each node in the distributed system may include the necessary functionality (and information) to participate in aggregating data (as described above). The exact functionality and information required by each node to participate in aggregating data may vary depending on how the distributed nodes are configured. The aforementioned nodes may then remain inactive (at least with respect to aggregating data) until such time as they receive a message to initiate the aggregation of data.

Figure 5:
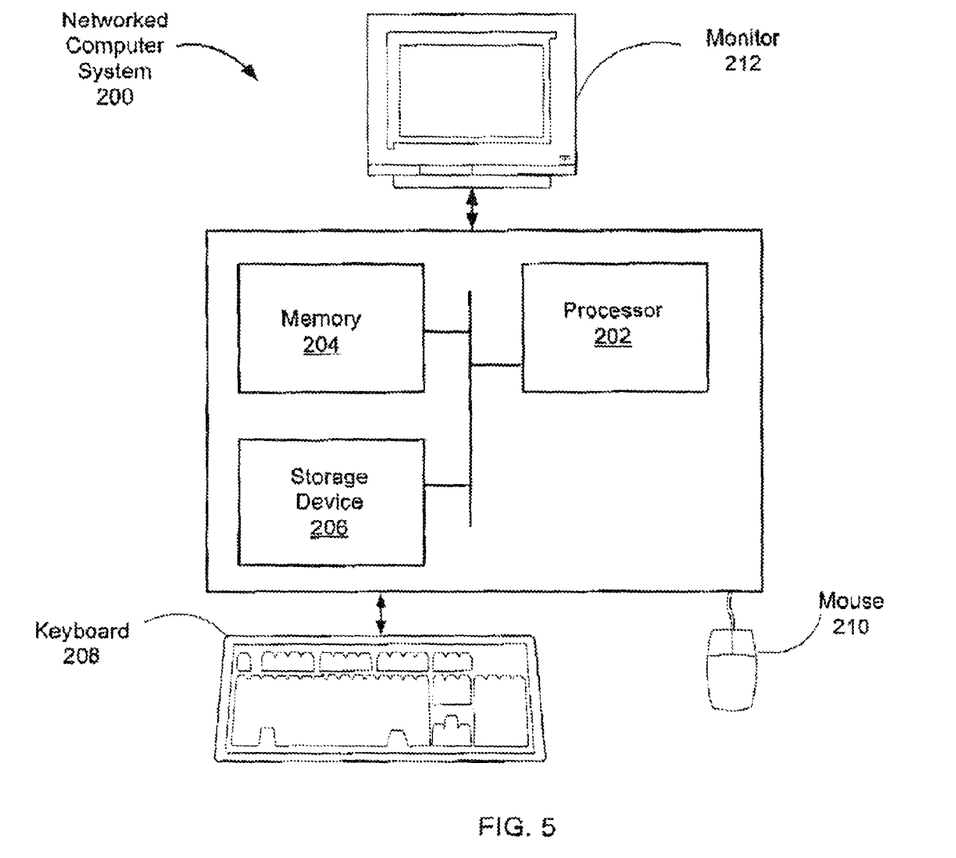
FIG. 5 shows a computer system in accordance with one embodiment of the invention.

An embodiment of the invention may be implemented on virtually any type of computer regardless of the platform being used. For example, as shown in FIG. 5, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for aggregating data in a distributed system, comprising:

specifying an aggregation scope comprising a plurality of nodes, wherein the plurality of nodes comprise a first destination node and a first plurality of non-destination nodes;

defining a first aggregation tree for the plurality of nodes using at least one Distributed Hash Table, wherein the first destination node is the root of the first aggregation tree and wherein each of the first plurality of non-destination nodes is one selected from the group consisting of an interior node and a leaf node in the first aggregation tree;

determining a first final aggregation result for the first aggregation tree using an aggregation function and aggregation data stored on the first destination node and the first plurality of non-destination nodes;

storing the first final aggregation result on a memory of the first destination node; and verifying the first final aggregation result, wherein verifying the first final aggregation result comprises:

specifying a second destination node and a second plurality of non-destination nodes, wherein the second destination node and the second plurality of non-destination nodes are within the aggregation scope;

defining a second aggregation tree for the plurality of nodes using the at least one Distributed Hash Table, wherein the second destination node is the root of the second aggregation tree and wherein each of the second plurality of non-destination nodes is one selected from the group consisting of an interior node and a leaf node in the second aggregation tree;

determining a second final aggregation result for the second aggregation tree using the aggregation function and the aggregation data stored on the second destination node and the second plurality of non-destination nodes; and determining whether the first final aggregation result is equal to the second final aggregation result.

2. The method of claim 1, further comprising:

initiating a determination of the first final aggregation result for the first aggregation tree using an initiation method.

3. The method of claim 2, wherein the initiation method comprises at least one selected function from the group consisting of scheduled initiation and broadcast initiation.

4. The method of claim 1, wherein the aggregation function comprises a function which is both commutative and associative.

5. The method of claim 1, wherein the plurality of nodes in the first aggregation tree communicate using a DHT.

6. A method for aggregating data in a distributed system, comprising:

specifying an aggregation scope comprising a plurality of nodes, wherein the plurality of nodes comprise a first destination node and a first plurality of non-destination nodes;

initiating data aggregation using an initiation method, wherein the initiation method initiates data aggregation in the plurality of nodes;

receiving a first intermediate aggregation result by at least one of the first plurality of non-destination nodes;

applying an aggregation function to the first intermediate aggregation result and a first local aggregation data by the at least one of the first plurality of non-destination nodes to obtain a first updated intermediate aggregation result, wherein the first local aggregation data is obtained from the at least one of the first plurality of non-destination nodes;

forwarding the first updated intermediate aggregation result to the first destination node, wherein the forwarding the first updated aggregation result comprises using a first Distributed Hash Table (DHT);

applying the aggregation function to the first updated intermediate aggregation result and a second local aggregation data by the first destination node to obtain a first final aggregation result, wherein the second local aggregation data is obtained from the first destination node;

storing the first final aggregation result on a memory of the first destination node; and verifying the first final aggregation result, wherein verifying the first final aggregation result comprises:

selecting a second destination node and a second plurality of non-destination nodes from the plurality of nodes;

initiating data aggregation using an initiation method, wherein the initiation method initiates data aggregation in the plurality of nodes;

receiving a second intermediate aggregation result by at least one of the second plurality of non-destination nodes;

applying an aggregation function to the second intermediate aggregation result and a third local aggregation data by the at least one of the second plurality of non-destination nodes to obtain a second updated intermediate aggregation result, wherein the third local aggregation data is obtained from the at least one of the second plurality of non-destination nodes;

forwarding the second updated intermediate aggregation result to the second destination node, wherein forwarding the second updated aggregation result comprises using a second Distributed Hash Table (DHT);

applying the aggregation function to the second updated intermediate aggregation result and a fourth local aggregation data by the second destination node to obtain a second final aggregation result, wherein the fourth local aggregation data is obtained from the second destination node; and determining whether the first final aggregation result is equal to the second final aggregation result.

7. The method of claim 6, wherein the initiation method comprises at least one selected from the group consisting of scheduled initiation and broadcast initiation.

8. The method of claim 6, wherein the aggregation function comprises a function which is both commutative and associative.

9. A distributed system, comprising:

a first aggregation tree comprising a first destination node and a first plurality of non-destination nodes, wherein the first destination node comprises a memory;

wherein the first destination node and the first plurality of non-destination nodes are within an aggregation scope;

wherein the first destination node and the first plurality of nodes communicate using at least one distributed hash table, wherein each of the non-destination nodes communicate with each other using at least one distributed hash table, and wherein the first destination node and the first plurality of non-destination nodes are configured to determine a first final aggregation result for the first aggregation tree using an aggregation function and aggregation data stored on the first destination node and the first plurality of non-destination nodes, wherein the first final aggregation result is stored on the memory of the first destination node; and a second aggregation tree comprising a second destination node and a second plurality of non-destination nodes, wherein the second destination node and the second plurality of non-destination nodes are within the aggregation scope;

wherein the second destination node and the second plurality of nodes communicate using at least one distributed hash table, wherein each of the non-destination nodes communicate with each other using at least one distributed hash table, wherein the second destination node and the second plurality of non-destination nodes are configured to determine a second final aggregation result for the second aggregation tree using an aggregation function and aggregation data stored on the second destination node and the second plurality of non-destination nodes, and wherein the second final aggregation result is used to verify the first final aggregation result.

10. The distributed system of claim 9, wherein the aggregation function comprises a function which is both commutative and associative.

11. The distributed system of claim 9, wherein the first destination node comprises functionality to initiate a determination of the first final aggregation result for the first aggregation tree using an initiation method.

12. The distributed system of claim 11, wherein the initiation method comprises at least one selected from the group consisting of scheduled initiation and broadcast initiation.

13. A computer readable medium comprising software instructions for aggregating data in a distributed system, the software instructions comprising functionality to:

specify an aggregation scope comprising a plurality of nodes, wherein the plurality of nodes comprise a first destination node and a first plurality of non-destination nodes;

define a first aggregation tree for the plurality of nodes using at least one Distributed Hash Table, wherein the first destination node is the root of the first aggregation tree and wherein each of the first plurality of non-destination nodes is one selected from the group consisting of an interior node and a leaf node in the first aggregation tree;

determine a first final aggregation result for the first aggregation tree using an aggregation function and aggregation data stored on the first destination node and the first plurality of non-destination nodes;

store the first final aggregation result on a memory of the first destination node; and verify the first final aggregation result wherein verifying the first final aggregation result comprises:

specifying a second destination node and a second plurality of non-destination nodes, wherein the second destination node and the second plurality of non-destination nodes are within the aggregation scope;

defining a second aggregation tree for the plurality of nodes using the at least one Distributed Hash Table, wherein the second destination node is the root of the second aggregation tree and wherein each of the second plurality of non-destination nodes is one selected from the group consisting of an interior node and a leaf node in the second aggregation tree;

determining a second final aggregation result for the second aggregation tree using the aggregation function and the aggregation data stored on the second destination node and the second plurality of non-destination nodes, and determining whether the first final aggregation result is equal to the second final aggregation result.

* * * * *